Patented Mar. 7, 1950

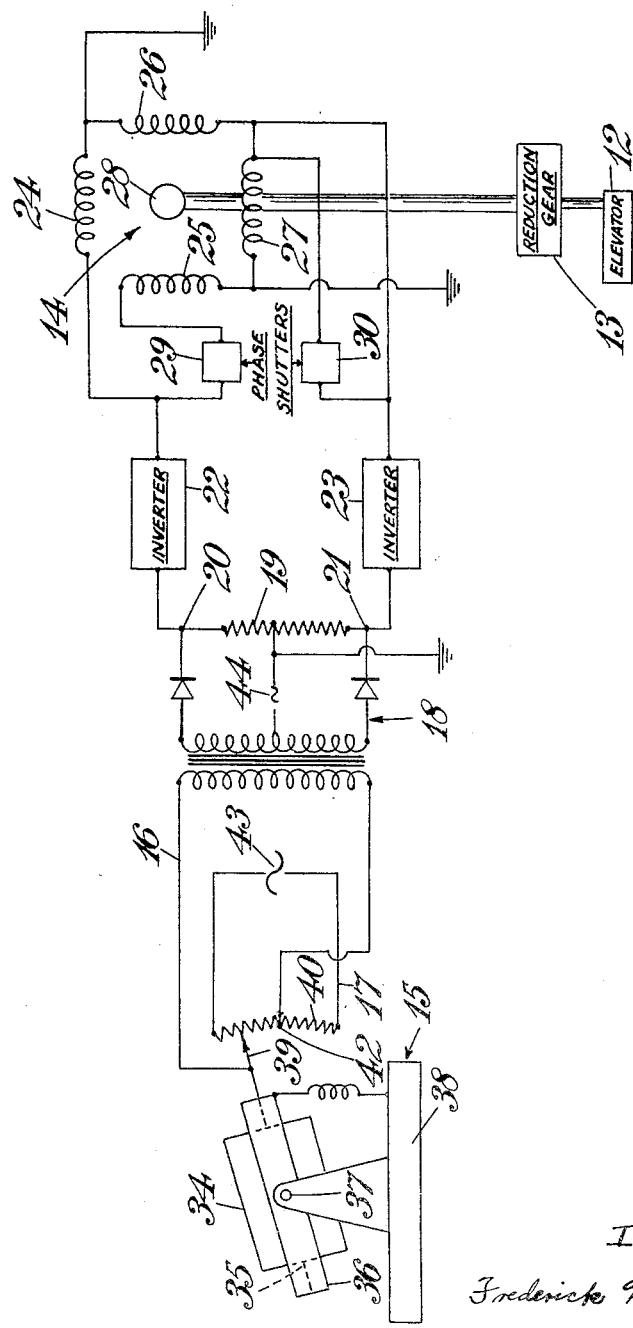

2,499,664

UNITED STATES PATENT OFFICE 2,499,664

ELECTRIC SERVOMOTOR AND SYSTEM CONTROLLED THEREBY

Frederick William Meredith, Cricklewood, London, England, assignor to S. Smith & Sons (England) Limited, a British company Application January 24, 1944, Serial No. 519,463
In Great Britain September 29, 1942

6 Claims. (Cl. 318—489)

This invention relates to control systems for maintaining a condition constant of the kind in which a detector for detecting a variation in the said condition controls the operation of a servomotor to restore the said condition. In all such systems there should be a certain relationship maintained between the change of the condition and the resultant movement of the motor. Thus in the case where it is desired to stabilise a platform about an axis in an aircraft a detector may be mounted on the platform to detect rotation of the platform and the servomotor may be coupled direct to the platform to rotate it about the axis to effect stabilisation. As explained in my copending United States application Serial No. 523,345, filed February 21, 1944, now abandoned, corresponding to British Specification No. 12,865/43 the speed of the motor should be proportional to the detected rotation. Similarly in the case where it is desired to stabilise an aircraft in yaw a detector may be mounted to detect rotation in yaw and the motor controls the aircraft indirectly by operating the rudder. In this case the speed of the motor should be proportional to the rate of yaw. A rotation detector suitable for the purpose described is disclosed in my copending application Serial No. 504,072, filed September 27, 1943.

In all such cases there is a tendency for the motor to lag so that the necessary relationship between the change of the condition and the resultant movement of the motor is not maintained and this may result in hunting. The object of the present invention is to reduce this lag to a minimum.

According to the present invention a synchronous motor is used as the servomotor and its speed is controlled by varying the frequency of an A. C. supply thereto obtained from an inverter which is in turn controlled by the detector so that the necessary relationship is maintained between the detected change of condition and the frequency of the inverter output.

By an "inverter" is meant a static device, such as a thermionic valve circuit, for converting a D. C. potential into an A. C. potential of controllable frequency. Such a device, since it contains no moving parts, is free from inertial lag and the synchronous motor, unless it is stalled, must move in synchronism with the supply.

As already mentioned a synchronous electric motor is used as the servomotor and means are provided for converting the rate of change of the condition into a change of frequency of an alternating current supply to the servomotor. The converting means, i. e. the form of inverter chosen will depend on the nature of the condition. Thus, if the condition is the direction or position of a body, the movement of the body may effect operation of a condenser or inductance of an oscillator circuit by an amount dependent on the rate of change of direction or position, the oscillator controlling the frequency of the supply. Alternatively if the rate of change of condition can be converted into a voltage proportional to the rate of change then the voltage can be used to control a thermionic reactance in an oscillator circuit to control the frequency of the supply or to control the frequency of a thermionic or gas filled valve inverter circuit. Where the condition is the rotational position of a body, the rate of rotation may conveniently be converted into a voltage by a device of the kind described in the above-mentioned application Serial No. 504,072.

The servomotor may comprise two synchronous motors differentially coupled so that the resultant movement of the servomotor is the differential movement of the two synchronous motors and the frequency of the supply to one motor may be increased when the frequency of the supply to the other motor is decreased and vice versa. In this arrangement the two motors may be combined to form a single motor by providing both the rotor and the stator with a rotating field so that the rotor rotates at a speed which is proportional to the difference of the speeds of the two fields. Motors of this kind are known as devices for indicating the difference of two electrical frequencies for example in devices for synchronising alternators.

A synchronous motor has the great advantage that unless it is "stalled" it must move in synchronism with the rotating field and hence if the rotating field be caused to rotate at a speed proportional to the rate of change of condition it must move in phase with the condition.

The invention has particular utility for stabilising a moving object, for example stabilising an aircraft in yaw, pitch or roll, stabilising a gun or sight on a ship, or stabilising a camera or bomb sight on an aircraft. For this purpose in accordance with the invention it is only necessary to provide a detector for measuring the speed of angular movement of the craft or body about a selected axis and to operate a synchronous motor at a speed proportional to this speed, the motor being connected so as to rotate the object at the same angular speed and in the reverse direction to the angular movement of the craft or body.

The accompanying drawing illustrates diagrammatically and by way of example one form of apparatus embodying this invention and intended for stabilizing an aircraft in pitch.

In the drawings, 12 represents the elevators controlled through a reduction gear 13 by a servo-motor 14. Servo-motor 14 is in turn controlled by a device 15 responsive to rate of turn in pitch as will be explained hereinafter.

The rate of pitch device may be of any form which generates an A. C. signal of a datum frequency and an amplitude substantially proportional to the detected rate of turn about the pitch axis. Thus it may be the device described in my United States Patent No. 2,455,939, granted December 14, 1948, resulting from my co-pending application Serial No. 504,072, which device comprises a tine or tuning fork maintained in vibration in one direction at a fixed frequency of oscillation and means for detecting or measuring the periodic force in the normal direction as an A. C. signal of the fixed frequency and of amplitude proportional to the deviation of the tine in the normal direction and hence to the detected rate of turn about the axis parallel with the tine itself.

Alternatively, the rate of pitch device may comprise a rate of turn gyroscope of known form controlling the sliding arm of an arcuate electric potentiometer supplied with the output from a constant amplitude A. C. source so that the slider arm is displaced from a fixed tapping by an amount proportional to the precessional displacement of the gyroscope due to the detected rate of pitch. Such an arrangement is very well known, as exemplified in United States patents to Watson 2,014,825, Thiry 2,190,390, Ziebolz 2,195,351, or von Manteuffel 2,299,117, and is illustrated diagrammatically in the drawing.

In the drawing, the gyroscope is shown as comprising a rotor 34 mounted on a spin axis 35 in a gimbal ring 36 gimballed about an axis 37 on a fixed base 38. Base 38 is arranged in the aircraft so that the gyroscope is responsive to a rate of turn about an axis parallel to the pitch axis of the aircraft. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the midpoint 42 of the resistance 40. The resistance 40 is connected across the constant amplitude A. C. source 43. The electrical output of the gyroscope appears between the contact 39 and the midpoint 42.

In operation any turn about an axis (the pitch axis) normal to the base 38 results in precession of the gyroscope about the axis 37 against the spring restraint to an extent determined by the rate of turn about the pitch axis. Hence the output voltage will be proportional to the rate of turn.

The A. C. output from the device 15, whether of the form illustrated in the accompanying drawing or of the form described in co-pending application Serial No. 504,072 (U. S. Patent No. 2,455,939, December 14, 1948), is applied through the leads 16, 17 to the input of a rectifier of a known design illustrated at 18 and provided with a source 44 of A. C. current of the same frequency as the output of the source 43 or as the frequency of vibration of the tine of the rate of turn device described in my above-mentioned patent. The output from the rectifier 18 appears across the resistance 19 which is earthed at its center point so that the D. C. potentials of the ends 20, 21 of the resistance vary from zero by equal amounts in opposite directions in proportion to the amplitude of the A. C. applied to the input of the rectifier 18.

Point 20 of resistance 19 is connected to the input of an inverter circuit 22. Such a circuit gives a constant amplitude A. C. output of a frequency which varies from a datum value $F_0$ by an amount F proportional to the magnitude of the D. C. input. These circuits which are very well known are illustrated and described in, for example, British Patent Specifications No. 443,423 and 489,094 and an article by Travis at pages 1132 to 1141 of volume 23, No. 10 of the Proceedings of the Institution of Radio Engineers.

Point 21 of resistance 19 is connected to a second inverter circuit 23 which is identical with circuit 22. The datum frequency (corresponding to zero input) of the output is again $F_0$ and the relationships between the frequency deviation of the outputs from $F_0$ and the magnitude of the input signals are the same. Thus when device 15 is subjected to rate of turn in pitch, the potentials of points 20, 21 rise or fall respectively or vice-versa by an amount proportional to the detected rate of turn and the frequencies of the outputs from circuits 22, 23 are respectively $F_0+F$ and $F_0-F$ where F is proportional to the detected rate of turn.

Motor 14 is a frequency difference motor having two stator windings 24, 25 and two rotor windings 26, 27 providing stator and rotor rotating fields which rotate in the same direction so that the rotor 28 rotates at a speed proportional to the difference of the speed of rotation of the two fields. Stator winding 24 is connected to the output of circuit 22 direct while stator winding 25 is connected to the output of circuit 22 through a phase-shifting device 29 so as to produce the necessary phase shift to produce the stator rotating field which then rotates at a speed proportional to $F_0+F$.

Rotor windings 26, 27 are similarly connected direct and through the phase shifting device 30 respectively to the output of circuit 23 so that the rotor rotating field rotates at a speed proportional to $F_0-F$.

The rotor of motor 14 and the elevators are therefore actuated at a speed proportional to the difference 2F of the frequencies of the outputs of circuits 22, 23 and hence at a speed proportional to the detected rate of turn.

Gear 13 is arranged so that, if a disturbance about the pitch axis occurs, the elevators 12 will be operated in a direction tending to turn the aircraft about the pitch axis in an opposite direction to that of the disturbance. A control system of this nature very rapidly stabilizes any disturbance which may occur.

As there can be no slip in the frequency differences in the servo-motor 14 and the method of obtaining a control voltage proportional to the rate of turn is such as to introduce the very minimum of lag, it will be appreciated that the movement of the elevators 12 will be substantially in anti-phase with the pitching movements of the aircraft due to a disturbance in pitch. It is therefore unnecessary to introduce any control proportional to the rate of change of rate of pitch (or the differential of the rate of pitch). Furthermore as it is purely a speed control it is not necessary to provide any follow up. It will thus be seen that the aircraft is completely stabilised in pitch and that the only connections to the servomotor 14 are electrical.

The servomotor 14 is designed so that it will provide sufficient torque for all normal purposes, but if an excessive torque is applied it will pull out thus acting as an automatic cut-out device to prevent the application of sudden or dangerous elevator movements which might damage the aircraft. Any pulling out of the motor 14 in this way is arranged to operate an overload release in the supply circuit to the motor so that after pulling out the system has to be re-set manually after the fault which caused the cutting out has been cleared.

An aircraft has two natural periods of oscillation about the pitch axis, one a short period oscillation and the other a long period oscillation. During any disturbance it is the long period oscillation which it is necessary to damp as the other oscillation is already heavily damped. An automatic pilot will however endeavour to respond also to the short period oscillation. If the power of the servomotor 14 is insufficient to enable it to follow these oscillations it will, in all previous systems, lag in phase and this may result in the amplification of the short period oscillations instead of their damping. Consequently it has in the past always been necessary to build the servomotor with sufficient power to follow the short period disturbance. The synchronous motor of the present invention need not be provided with sufficient power to follow large oscillations at the short period, provided that provision is made to limit the speed of the motor at a value sufficient for long period control. Such a limitation of speed will reduce the amplitude of response for an excessive disturbance without however causing any loss of phase and may be achieved, for example, by causing the signal from the rate-of-turn device to modulate differentially a carrier or reference signal of the same frequency supplied to two demodulators. Maximum speed of the servomotor will be reached when the signal becomes equal to the carrier and, for a further increase of signal, the motor speed will be unchanged. This has a great advantage not only in reducing the size of the servomotor but also in causing the aircraft to ride more comfortably.

From the above description it will be evident that the aircraft could be stabilised in exactly the same manner about either of its other two axes (the axes of roll and of yaw). Furthermore a number of objects could be stabilised about any particular axis from one single rate-of-turn detector 15. Thus in the case described above a number of platforms, carrying for example cameras and bomb sights, could be stabilised in pitch simply by rotating them about the pitch axis by means of synchronous motor devices such as that described above and driving these motors from the outputs of inverter circuits 22 and 23.

I claim:

1. A control system of the class described for maintaining a condition constant, said system comprising in combination a detector yielding a signal proportional to a detected change of condition, a device for varying said condition in a sense opposed to that of the detected change, a servomotor for actuating said device, said servomotor comprising a synchronous motor the speed of which is controlled by varying the frequency of the alternating current supplied thereto, means comprising an inverter connected with said detector and with said servomotor for supplying the latter with alternating current of a frequency varying proportionately with the signal representing the detected change of condition.

2. A control system in accordance with claim 1, wherein the detector detects the rate of change of a variable quantity.

3. A control system of the class described for maintaining a condition constant, said system comprising in combination a detector yielding a signal proportional to a detected change of condition, a device for varying said condition in a sense opposed to that of the detected change, a servomotor for actuating said device, said servomotor comprising a synchronous motor having a plurality of rotating fields, means comprising an inverter connected with said detector and with said motor for supplying an alternating current to one of said fields which has a frequency which varies from a datum value by an amount proportional to the detected change, means for supplying a second alternating current to another of said rotating fields, whereby the motor rotates at a speed proportional to the difference of the speeds of the two rotating fields.

4. A control system in accordance with claim 3 wherein the said alternating currents have frequencies which vary in opposite directions from a datum value by equal amounts proportional to the detected change.

5. A control system of the class described for maintaining the rotational position of a body about an axis, said system comprising in combination a detector yielding an alternating control voltage the amplitude of which is proportional to the rate of turn of said body, a device for rotating said body in a direction opposed to that of the detected turn, a servomotor for actuating said device, said servomotor comprising a synchronous motor the speed of which is controlled by varying the frequency of the alternating current supplied thereto, means comprising an inverter connected with said detector and with said servomotor for supplying the latter with alternating current of a frequency which varies from a datum value by an amount proportional to the amplitude of the voltage output of the turn detector.

6. Apparatus for stabilising an aircraft, a platform thereon, or the like, about one of its orthogonal axes such as the pitch axis, said apparatus comprising in combination a rate-of-turn device which provides an alternating control voltage the amplitude of which is proportional to the rate of turn, two thermionic valve inverter circuits each of which produces an alternating current the frequency of which varies equally from a datum value by an amount in accordance with the control voltage, but in opposite senses in the two circuits, and coupled thereto a synchronous motor having a two-phase stator and a two-phase rotor providing rotating fields which rotate in the same direction so that the motor rotates at a speed proportional to the difference of the speeds of rotation of the two fields, means for applying to the stator windings the alternating current from one of said inverter circuits, means for applying to the rotor windings the alternating current from the other of said inverter currents, whereby the rotor rotates at a speed proportional to the difference in the frequencies of said alternating currents, and restoring controls for the member to be stabilized actuated by said motor through gear connections.

FREDERICK WILLIAM MEREDITH.

REFERENCES CITED

The following references are of record in the file of this patent:

UNITED STATES PATENTS

| Number | Name | Date |
|---|---|---|
| 1,881,011 | Wittkuhns | Oct. 4, 1932 |
| 2,068,490 | Hull | Jan. 19, 1937 |

FOREIGN PATENTS

| Number | Country | Date |
|---|---|---|
| 528,037 | Great Britain | Oct. 27, 1940 |